United States Patent
Choi et al.

(10) Patent No.: US 8,411,693 B2
(45) Date of Patent: Apr. 2, 2013

(54) METHOD FOR CONTROLLING ELECTRIC POWER OF ELECTRIC POWER CONTROLLER, LRWPAN-ETHERNET BRIDGE AND SENSOR NODE

(75) Inventors: Chang-Sic Choi, Daejeon (KR); Wan-Ki Park, Daejeon (KR); Jin-Soo Han, Daejeon (KR); Hyun-Woo Oh, Daejeon (KR); Jong-Hyun Jang, Daejeon (KR); Dong-Won Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 251 days.

(21) Appl. No.: 12/963,137

(22) Filed: Dec. 8, 2010

(65) Prior Publication Data

US 2011/0149818 A1 Jun. 23, 2011

(30) Foreign Application Priority Data

Dec. 18, 2009 (KR) .......................... 20-2009-0126709
Apr. 15, 2010 (KR) .......................... 10-2010-0034985

(51) Int. Cl.
*H04L 12/28* (2006.01)

(52) U.S. Cl. ........................................ 370/401; 370/402

(58) Field of Classification Search .................. 370/401, 370/402, 389, 395.53
See application file for complete search history.

(56) References Cited

U.S. PATENT DOCUMENTS 7,886,165 B2 * 2/2011 Khan et al. .................... 713/300

FOREIGN PATENT DOCUMENTS

| KR | 20-2008-0004708 | 10/2008 |
| KR | 10-2008-0102637 | 12/2008 |

* cited by examiner

*Primary Examiner* — Brenda H Pham
(74) *Attorney, Agent, or Firm* — Staas & Halsey LLP

(57) ABSTRACT

The network configuration technology for controlling an electric power sensor node is disclosed. The method for controlling electric power includes transmitting an an Ethernet packet type command message to at least one electric power sensor node through an LRWPAN-Ethernet bridge in accordance with profile information related to an electric power control, the profile information being set by a user; receiving LR-WPAN packet type response messages transmitted from the at least one electric power sensor node in response to the Ethernet package type command message as Ethernet packet type response messages through the LRWPAN-Ethernet bridge; and providing a control result of an electric power equipment corresponding to the at least one electric power sensor node to the user based on the Ethernet packet type response messages.

8 Claims, 8 Drawing Sheets

METHOD FOR CONTROLLING ELECTRIC POWER OF ELECTRIC POWER CONTROLLER, LRWPAN-ETHERNET BRIDGE AND SENSOR NODE

CROSS REFERENCE TO RELATED APPLICATIONS

This application claims the benefit of Korean Patent Application Nos. 10-2009-0126709, filed on Dec. 18, 2009 and 10-2010-0034985, filed on Apr. 15, 2010, which are hereby incorporated by reference in their entirety into this application.

BACKGROUND OF THE INVENTION

1. Field of the Invention

The present invention relates to a network configuration technology for controlling an electric power sensor node of 802.15.4 LR-WPAN (Low Rate Wireless Personal Area Network), and more particularly, to a method for controlling electric power of an electric power controller, an LRWPA-Ethernet bridge, and an electric power sensor node for solving a problem related to a shadow area which may easily occur during wireless connection and low-power network configuration.

In the case of a network for sensors which are currently being researched, a Zigbee stack is loaded or a wireless LAN is mounted on the 802.15.4 LR-WPAN, but the present invention relates to an embedded device utilizing a wire/wireless integrated network and a superlight protocol implementing technology for removing demerits such as low power consumption of an electric power sensor, and distortion and interference caused by a wireless signal.

2. Description of the Related Art

In recent years, a climate convention and a green computing technology based on reduction of a carbon discharge volume have been required all over the world. In addition, various technologies for reducing power consumption generated by various electric appliances and office equipments and IT equipments in homes and offices which are daily increased are being researched. Among these technologies, the technological development of an electric power control network which can monitor power consumption amounts of equipments which are currently being used in real time and turn on/off the corresponding equipments when the corresponding equipments are not used or need energy conservation is also actively being researched.

The related arts are employing a technology of developing a power control monitoring device, and collecting related information from a remote area or a remote server through the existing wire/wireless network and control the collected information in order to configure such a power control network.

However, the wire network has a problem complicate wiring and self consumed power for various equipments and the wireless network has simple wiring, but has problems distortion and interference of a signal caused by wireless characteristics complexity of a building structure and generation of a shadow area in a closed space, etc. In addition, the wireless network has a problem of an increase of unnecessary load by using a wire/wireless network protocol stack such as TCP/IP, Zigbee, etc.

Further, for low power consumption and convenience of wireless connection, most sensor network configurations are currently being implemented by loading the Zigbee stack on the basis of an IEEE 802.15.4 LR-WPAN (Low Rate Wireless Personal Area Network). However, in the case of such a mechanism, the distortion and interference of the signal may easily occur due to the spatial complexity of the closed space, and homes and offices and the complexity and overhead of network configuration are caused by an increase of PAN coordinators for network interoperation.

SUMMARY OF THE INVENTION

An aspect of the present invention provides a method for configuring an electric power sensor network with high reliability and low electric power.

Another aspect of the present invention provides a supertight control method of a WPAN-Ethernet bridge device and a network layer protocol for providing high reliability of a wire network, and low electric power and easiness of network configuration of the wireless network, which is specialized for an electric power control network.

That is, another aspect of the present invention provides a method for controlling electric power of an efficient electric power controller, an LRWPA-Ethernet bridge, and an electric power sensor node in homes and offices and buildings, and complex structures through wire/wireless integration.

An exemplary embodiment of the present invention provides a method for controlling electric power in a electric power controller that includes: in accordance with profile information related to an electric power control, transmitting an Ethernet packet type command message to at least one electric power sensor node through an LRWPAN-Ethernet bridge; receiving LR-WPAN packet type response messages transmitted from the at least one electric power sensor node in response to the Ethernet package type command message as Ethernet packet type response messages through the LRWPAN-Ethernet bridge; and providing a control result of an electric power equipment to the user based on the Ethernet packet type response messages.

Another embodiment of the preset invention provides a method for controlling electric power in a LRWPAN-Ethernet bridge that includes: receiving an Ethernet packet type command message to transmitted to at least one electric power sensor node from an electric power controller; converting the Ethernet packet type command message into an LR-WPAN packet type command message through header conversion; transmitting the LR-WPAN packet type command message to the at least one electric power sensor node; and reconverting the LR-WPAN packet type response messages transmitted from the at least one electric power sensor node in response to the Ethernet packet type command message into Ethernet packet type response messages and retransmitting the reconverted the Ethernet packet type response messages to the electric power controller.

Yet another embodiment provides a method for controlling electric power in an electric power sensor node that includes: receiving an Ethernet packet type command message transmitted from an electric power controller as an LR-WPAN packet type command message through an LRWPAN-Ethernet bridge; controlling an electric power equipment in accordance with the Ethernet packet type command message; and transmitting a result performed in response to the Ethernet packet type command message as an LR-WPAN packet type response message through the LRWPAN-Ethernet bridge.

According to the embodiments of the present invention, it is possible to configure an electric power control network even in a shadow area where distortion and attenuation of a wireless signal may occur due to a wall or a structural position and a circumferential environment or an area where a plurality of wireless repeaters need to be duplicately installed.

Further, according to the embodiments of the present invention, a bridge device efficiently utilizing an infrastructure of a wireless network is mounted and the electric power sensor nodes in the shadow area may be connected through the corresponding bridge device.

According to the embodiments of the present invention, it is possible to provide both high reliability and low power consumption through an electric power control method using the bridge device which operates based on a lower-power minimum load type network layer having an electric power control function.

DETAILED DESCRIPTION OF THE PREFERRED EMBODIMENTS

Hereinafter, exemplary embodiments of the present invention will be described in detail with reference to the accompanying drawings. The description and accompanying drawings are shown to help understanding the present invention. A detailed description of related known functions or configurations will be omitted so as not to obscure the subject of the present invention.

The present invention uses an embedded device utilizing a wire/wireless integrated network and a superlight protocol implementing technology for removing demerits such as low power consumption of an electric power sensor, and distortion and interference caused by a wireless signal. That is, in the present invention, an electric power sensor node having an LRWPAN interface is interoperated with an electric power controller having an Ethernet interface. In addition, an LRW-PAN-Ethernet bridge is implemented in embedded equipment having both the LRWPAN interface and the Ethernet interface.

Figure 1:
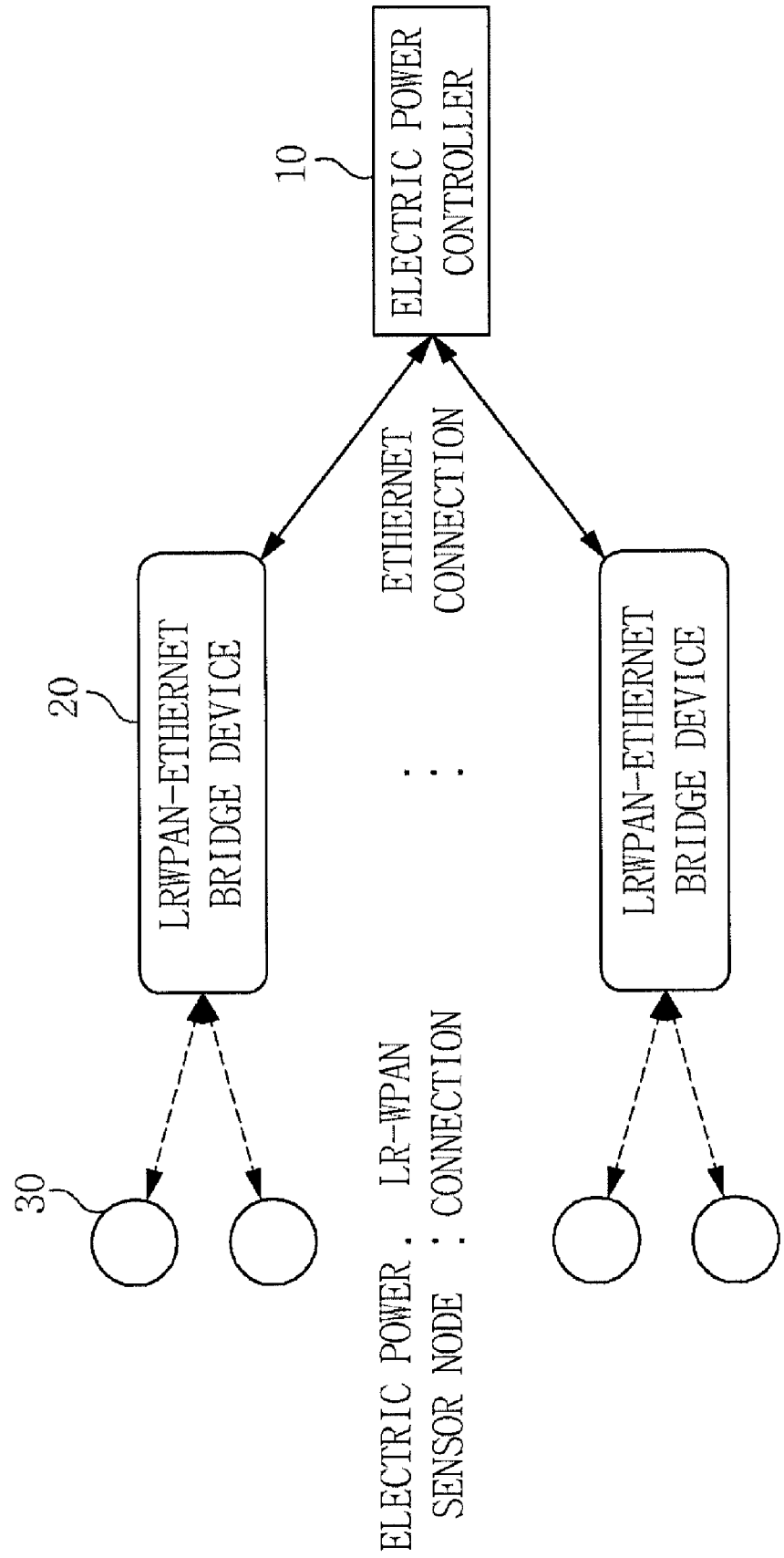
FIG. 1 is a diagram showing a configuration of an electric power control system according to an exemplary embodiment of the present invention.

FIG. 1 is a diagram showing a configuration of an electric power control system according to an exemplary embodiment of the present invention.

Referring to FIG. 1, the electric power control system to which an electric power control method according to the present invention includes an electric power controller 10 is applied, an LRWPAN-Ethernet bridge 20, and an electric power sensor node 30.

The electric power controller 10 controls electric power and is configured to control an electric power states and power supply on/off states of equipments connected to the electric power sensor node through a wire/wireless network.

For this, the electric power controller 10 shows information including configurations of the electric power sensor nodes 30 and a current power consumption amount to a user and receives a command to turn on/off power supplies of predetermined equipments which the user desires. In addition, when a new electric power sensor node is added, the electric power controller 10 performs a function to update information on the new electric power sensor node.

The LRWPAN-Ethernet bridge 20 receives a package transmitted from the electric power controller 10 and converts the form of the received packet into a form for transmitting the corresponding packet to the electric power sensor node 30 and thereafter, transmits the corresponding packet in an LR-WPAN packet form. Further, the power consumption amount information collected by the electric power sensor node 30 is transmitted to the LRWPAN-Ethernet bridge 20 and converted into an Ethernet packet to be transmitted to the electric power controller 10.

The electric power sensor node 30 performs both a function to collect information on power consumption by the connected equipments and a function to control the power supplies of the corresponding equipments.

Further, the electric power sensor node 30 is equipped with a function to interface with the LRWPAN-Ethernet bridge 20 through an LR-WPAN interface.

Figure 2:
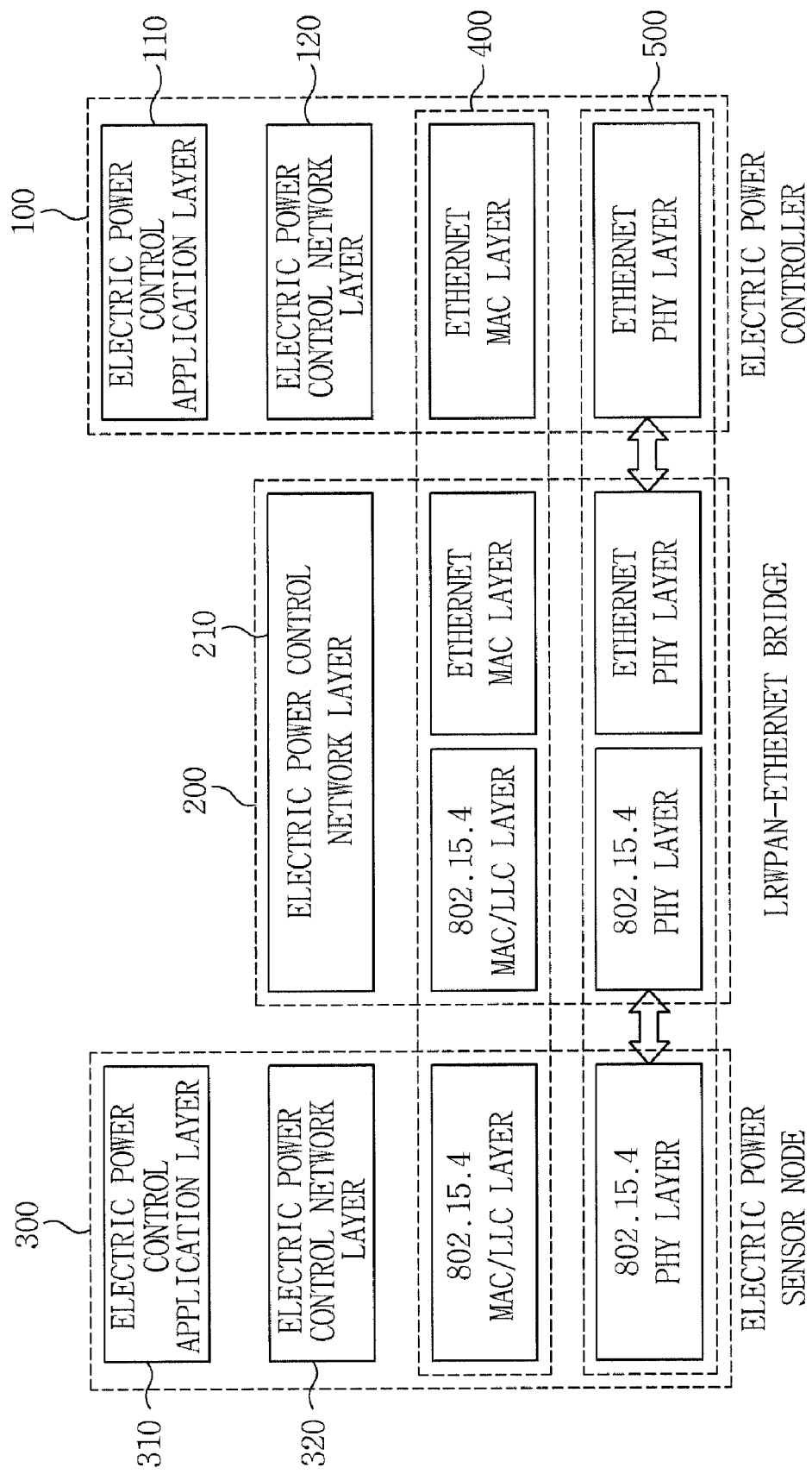
FIG. 2 is a diagram showing a configuration of protocol stacks of components which interoperate with each other for the system configuration of FIG. 1.

FIG. 2 is a diagram showing a configuration of protocol stacks of components which interoperate with each other for the system configuration of FIG. 1.

Referring to FIG. 2, the protocol stack 100 of the electric power controller 10 has an additional electric power control network layer 120 having a small load without using a general TCP/IP layer on the basis of an existing Ethernet MAC layer 400. In addition, the system has a structure having an electric power control application layer 110 where application modules for operating the electric power controller 10 are driven based on the electric power control network layer 120 to provide an efficient configuration of the electric power controller.

The protocol stack 200 of the LRWPAN-Ethernet bridge 20 includes an electric power control network layer 210 that interoperates the packet through a wire/wireless interface at both sides on the basis of the MAC layer 400 and a PHY layer 500 of the existing 802.15.4 LR-WPAN and Ethernet. As a result, the LRWPAN-Ethernet bridge 20 can implement a bridge device having a minimized load. The electric power control network layer 210 of the LRWPAN-Ethernet bridge 20 just converts a packet header without being equipped with an additional intelligent function module to control electric power in a low-power mechanism.

A protocol stack 300 of the electric power sensor node 30 is constituted by an electric power control network layer 320 and an application layer 310 for a sensor node on the basis of the 802.15.4 MAC layer 400 and the 802.15.4 PHY layer 500 which are basic stacks of the existing LRWPAN interface and has the same structure as the protocol stack 100 of the electric power controller 10. The type of a processed packet interface coincides with LR-WPAN and application modules processing a corresponding command are implemented in the application layer 310 in link with the application layer 110 of the electric power controller 10.

Figure 3:
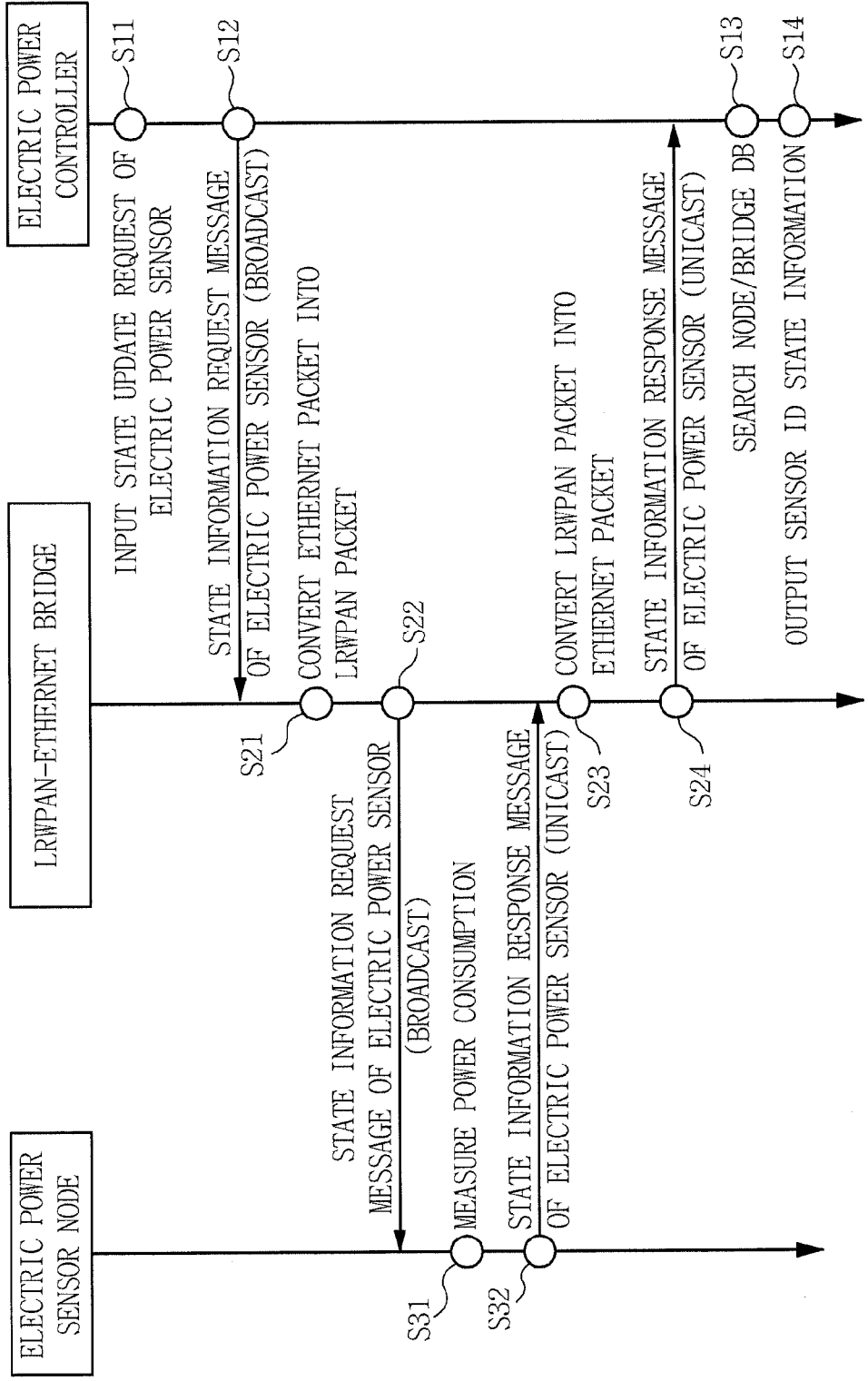
FIG. 3 is a processing flowchart of state information of an electric power sensor node 30 in the electric power control system.

FIG. 3 is a processing flowchart of state information of an electric power sensor node 30 in the electric power control system.

A method for controlling electric power of an electric power controller includes: in accordance with profile information related to an electric power control, the profile information being set by a user, allowing the electric power controller to transmit an Ethernet packet type command message to at least one electric power sensor nodes through an LRWPAN-Ethernet bridge; allowing the electric power controller to receive LR-WPAN packet type response messages transmitted from at least one electric power sensor nodes in response to the Ethernet package type command message as Ethernet packet type response messages through the LRWPAN-Ethernet bridge; and allowing the electric power controller to provide a control result of an electric power equipment to a user on the basis of the Ethernet packet type response messages.

Further, a method for controlling electric power of the LRWPAN-Ethernet bridge according to the embodiment of the present invention includes: allowing the LRWPAN-Ethernet bridge to receive the Ethernet packet type command message to be transmitted to at least one electric power sensor nodes from the electric power controller; allowing the LRWPAN-Ethernet bridge to convert the Ethernet packet type command message into the LR-WPAN type command message through header conversion; allowing the LRWPAN-Ethernet bridge to transmit the LR-WPAN type command message to at least one electric power sensor nodes; and allowing the LRWPAN-Ethernet bridge to reconvert the LR-WPAN type response messages transmitted from at least one electric power sensor nodes in response to the Ethernet packet type command message into the Ethernet packet type response messages and retransmit them to the electric power controller.

Further, the method for controlling electric power of the LRWPAN-Ethernet bridge includes: allowing the electric power sensor node to receive the Ethernet packet type command message transmitted from the electric power controller as the LR-WPAN packet type command message through the LRWPAN-Ethernet bridge; allowing the electric power sensor node to control the electric power equipment in accordance with the Ethernet packet type command message; and allowing the electric power sensor node to transmit a result performed in response to the Ethernet packet type command message as the LR-WPAN packet type response message through the LRWPAN-Ethernet bridge.

The method for controlling the electric power of each of the electric power controller, the LRWPAN-Ethernet bridge, and the electric power sensor node in the electric power control system constituted by the electric power controller, the LRWPAN-Ethernet bridge, and the electric power sensor node will be described in detail with reference to embodiments to be described below.

Referring to FIG. 3, a sequence of processing the state information of the electric power sensor node 30 to which the electric power control method according to the embodiment of the present invention is applied will be described.

First, the electric power controller 10 receives a request for updating a state of the electric power sensor node (S11). That is, the electric power controller 10 processes a user's request input every predetermined time in accordance with profile information related to an electric power control. The profile information is defined by a user. In addition, the electric power controller 10 determines when to perform a command to aggregate the state information of the electric power sensor node 30.

Next, the electric power controller 10 transmits a message to request the state information of the electric power sensor node 30 when the corresponding command needs to be performed (S12). That is, the electric power controller 10 transmits the corresponding command message together with broadcast MAC addresses for the LRWPAN-Ethernet bridges 20 connected through an Ethernet network. In this case, the Ethernet payload is formed in the form of an LRWPAN-based packet which can be recognized by the electric power sensor node 30. Herein, the payload means contents of data which are actually transmitted.

Subsequently, the LRWPAN-Ethernet bridge 20 performs LRWPAN packet conversion of the transmitted command message (S21). That is, the LRWPAN-Ethernet bridge 20 removes an Ethernet header from the command message and converts the payload into an LRWPAN packet.

Next, the LRWPAN-Ethernet bridge 20 transmits the converted command message to the electric power sensor node 30 (S22).

The electric power sensor node 30 receives the transmitted LRWPAN packet type command message and the electric power sensor node 30 measures power consumption of an equipment connected with itself in accordance with the command message (S31).

In addition, the electric power sensor node 30 transmits the measurement value of the power consumption of the equipment to the LRWPAN-Ethernet bridge 20 in the form of a response message (S32). In this case, a response packet of the response message is again positioned at the Ethernet payload and transmitted in the form of the Ethernet packet using an MAC address of the electric power controller 10 as a destination address (S23 and S24).

Next, when the electric power controller 10 receives the response message, the electric power controller 10 searches a DB for the electric power sensor node 30 or the bridge (S13). That is, the electric power controller 10 filters the received response message by using the DB information for the electric power sensor node 30. The reason is that while some of the received packets are transmitted through bridge devices adjacent to the electric power sensor node 30, the duplicate and same response message may be transmitted due to radio interference or duplication.

Lastly, the electric power controller 10 outputs the received state information on the electric power sensor node 30 to the user. That is, the electric power controller 10 outputs a power consumption value collected from the electric power sensor node 30 to the user through a GUI. In this case, the electric power controller 10 may output information on electric power states of the electric power sensor nodes 30 together with IDs of the electric power sensor nodes 30.

Figure 4:
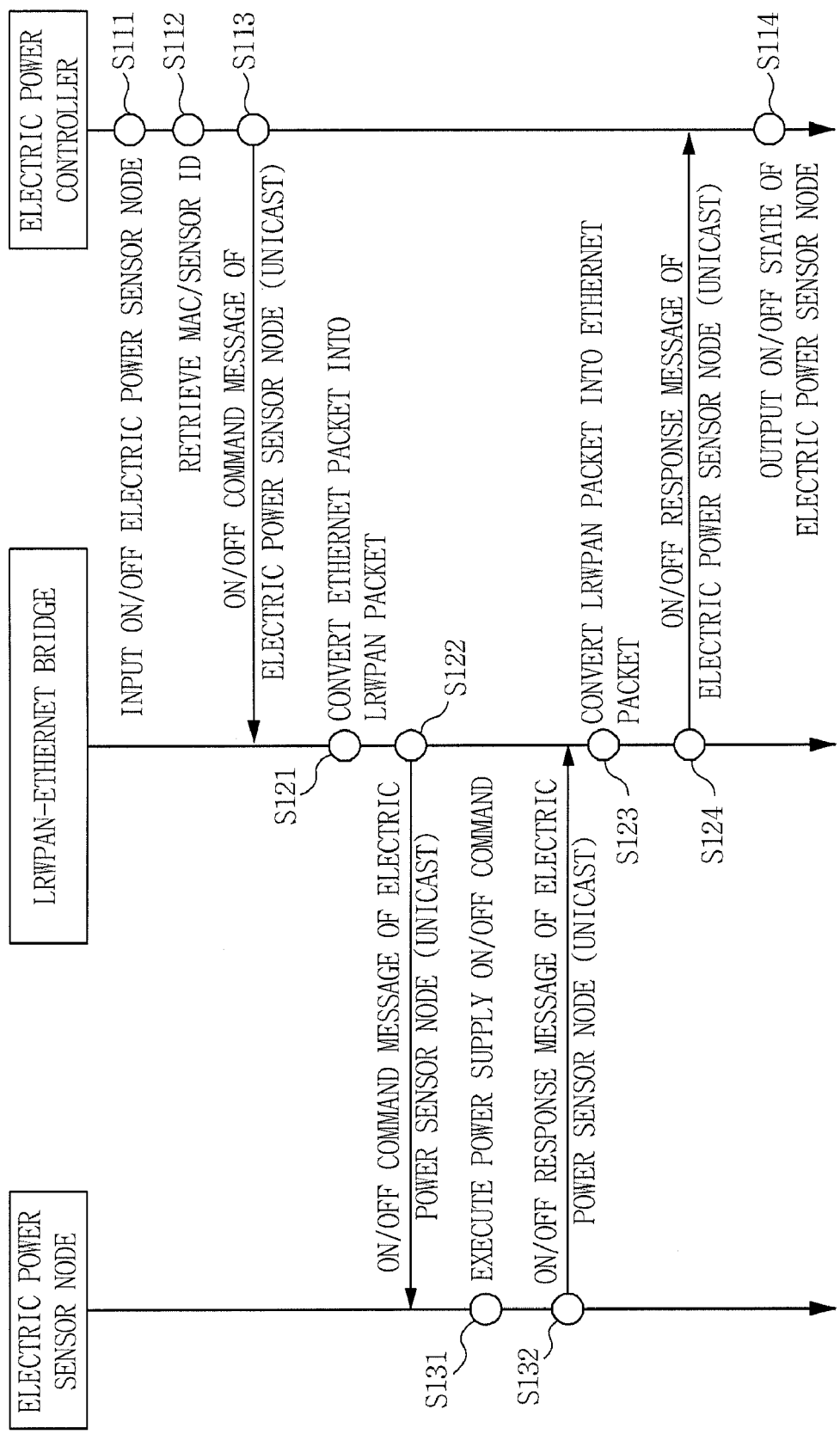
FIG. 4 is a processing flowchart for supporting a command to turn on or off a power supply of equipment connected to the electric power sensor node.

FIG. 4 is a processing flowchart for supporting a command to turn on or off a power supply of equipment connected to the electric power sensor node.

Referring to FIG. 4, the processing flow for supporting the command to turn on or off the power supply of the equipment connected to the electric power sensor node 30 to which the electric power control method according to the embodiment of the present invention is applied will be described.

First, the electric power controller 10 receives information on the electric power sensor node 30 which will perform the on/off command from the user through the GUI, etc. (S111).

Next, the electric power controller 10 retrieves an MAC/sensor ID (S112). That is, the electric power sensor node 30 retrieves Ethernet MAC information of the LRWPAN-Ethernet bridge 20 required to transmit the user's request command and information on the sensor ID required to generate the LRWPAN packet from the corresponding DB.

Next, the electric power controller 10 transmits the command to turn on/off the electric power sensor node 30 (S113). That is, the electric power controller 10 creates an electric power sensor command packet on the basis of collected each header information and transmits it through the Ethernet interface.

A command message transmission/reception procedure between the LRWPAN-Ethernet bridge 20 and the electric power sensor node 30 has the same sequence as the procedure shown in FIG. 3 (S121, S122, S131, S132, S124, and S124).

Herein, unlike the state information processing of FIG. 3, a unicast mechanism in which the corresponding packet is transmitted to only the LRWPAN-Ethernet bridge 20 connected with the electric power sensor node 30 to be controlled and the electric power sensor node 30 is used.

Meanwhile, at step S131, the electric power sensor node 30 performs a function to execute the power supply on/off command. The electric power sensor node 30 executes an on or off command for controlling the power supply of the equipment connected to the corresponding electric power sensor node 30 as a hardware command.

Thereafter, the electric power controller 10 receives the response message transmitted after the electric power sensor node 30 performs the command and outputs an on/off state of the electric power sensor node 30 to provide the state output result to the user (S114).

Figure 5:
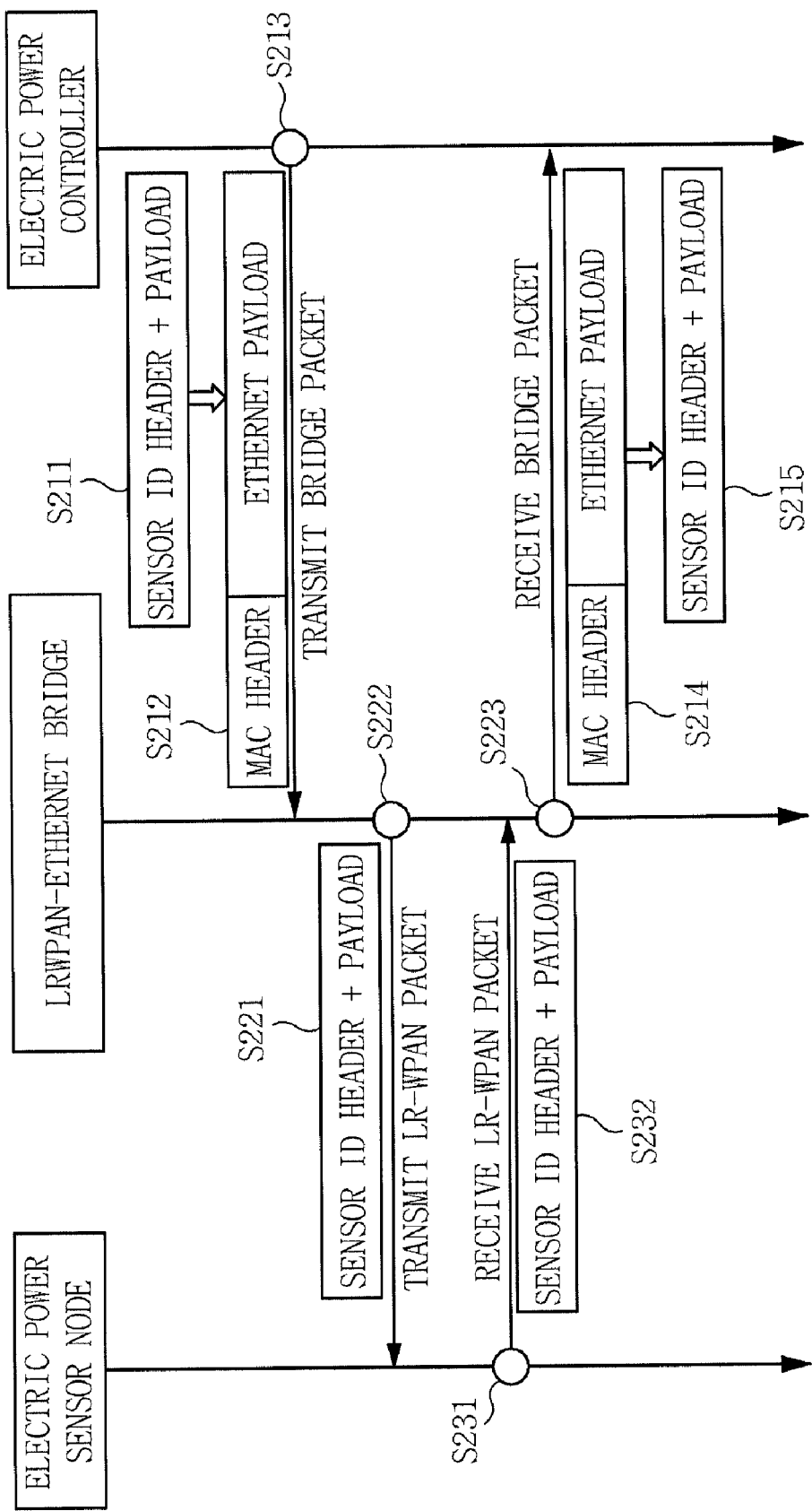
FIG. 5 is a diagram showing a packet processing process for each step in the electric power control system.

FIG. 5 is a diagram showing a packet processing process for each step in the electric power control system.

Referring to FIG. 5, the packet processing process for each step in the electric power control system to which the electric power control method according to the embodiment of the present invention is applied will be described.

First the electric power controller 10 generates a command message to be transmitted in the forms of a sensor ID header and an LRWPAN payload (S211). In this case, an Ethernet payload part is configured in the form of the LRWPAN packet. In addition, an Ethernet header generation part sets MAC address information of the LRWPAN-Ethernet bridge 20 which is a destination (S212).

Next, the LRWPAN-Ethernet bridge 20 converts a payload removed with an Ethernet header into the form of the LRWPAN packet (S221). The LRWPAN-Ethernet bridge 20 transmits the packet transmitted from the electric power controller 10 to the corresponding electric power sensor node 30 (S222).

Subsequently, the electric power sensor node 30 performs the command recorded in the payload (S231) and converts the corresponding payload into a result value. The electric power sensor node 30 generates a response message in the form of the LRWPAN packet and transmits the generated response message to the LRWPAN-Ethernet bridge 20 (S232).

Next, the LRWPAN-Ethernet bridge 20 adds an Ethernet MAC header to the received payload again (S214) and transmits the payload with the Ethernet MAC header to the electric power controller 10 (S223).

Lastly, the electric power controller 10 analyzes the payload part of the transmitted response message to extract a sensor ID value and a payload value (S215) and displays a command performing result to the user through the GUI.

Hereinafter, each configuration of the electric power control system according to the embodiment of the present invention will be described in more detail. In the description, duplications with the electric power control method according to the embodiment of the present invention will be omitted.

Figure 6:
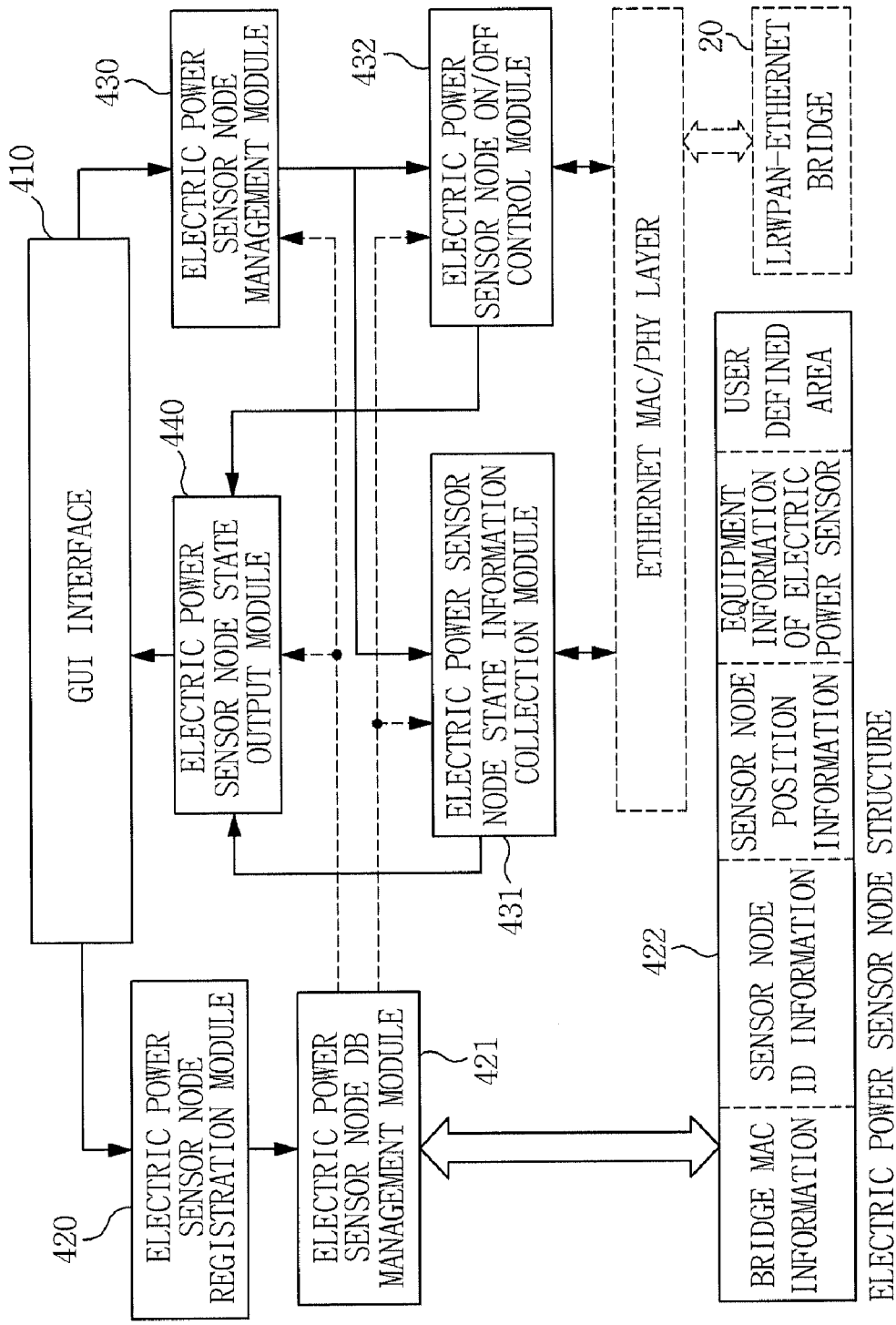
FIG. 6 is a diagram showing internal constituent modules of the electric power controller.

FIG. 6 is a diagram showing internal constituent modules of the electric power controller.

Referring to FIG. 6, the electric power controller includes a GUI interface module 410, an electric power sensor node registration module 420, an electric power sensor node DB management module 421, an electric power sensor node management module 430, an electric power sensor node state information collection module 431, and an electric power sensor node on/off control module 432.

The GUI interface module 410 allows the user to register the sensor node or outputs state values and current power consumption amounts of the electric power sensor nodes connected to the system. Further, the GUI interface module 410 provides a user interface which can set a power supply on/off control function with respect to a desired electric power sensor node.

The electric power sensor registration module 420 serves to receive the position of the electric power sensor node to be connected to equipment which will be subjected to monitoring and controlling the electric power and equipment information from the user. The received information on the electric power sensor nodes is managed in the form of an electric power sensor node structure 422 by analyzing an input value by the electric power sensor node DB management module 421.

The electric power sensor node DB management module 421 serves to provide the corresponding information when MAC information and sensor ID information are required in another internal module.

The electric power sensor node management module 430 serves to analyze a time interval defined by a user's profile, a command to update electric power information by a request from the user or a command to control a power supply of a predetermined electric power sensor node. In addition, the electric power sensor node management module 430 calls an internal module which will perform the corresponding command in accordance with the input.

The electric power sensor node state information collection module 431 processes a command to measure the power consumption amount of the equipment connected to the electric power sensor node. The electric power sensor node state information collection module 431 generates a command to be transmitted to the electric power sensor node to transmit the packet through the Ethernet MAC layer.

The electric power sensor node on/off control module 432 generates a command to control a power supply of equipment connected to a predetermined electric power sensor node and transmits it in the Ethernet packet form. The packets are transmitted to the LRWPAN-Ethernet bridge 20 connected through the Ethernet PHY layer.

Further, the electric power sensor node state information collection module 431 and the electric power sensor node on/off control module 432 receive response packets to the commands and transmit the results to the user through the GUI interface 410 by using the electric power sensor node state output module 440.

Figure 7:
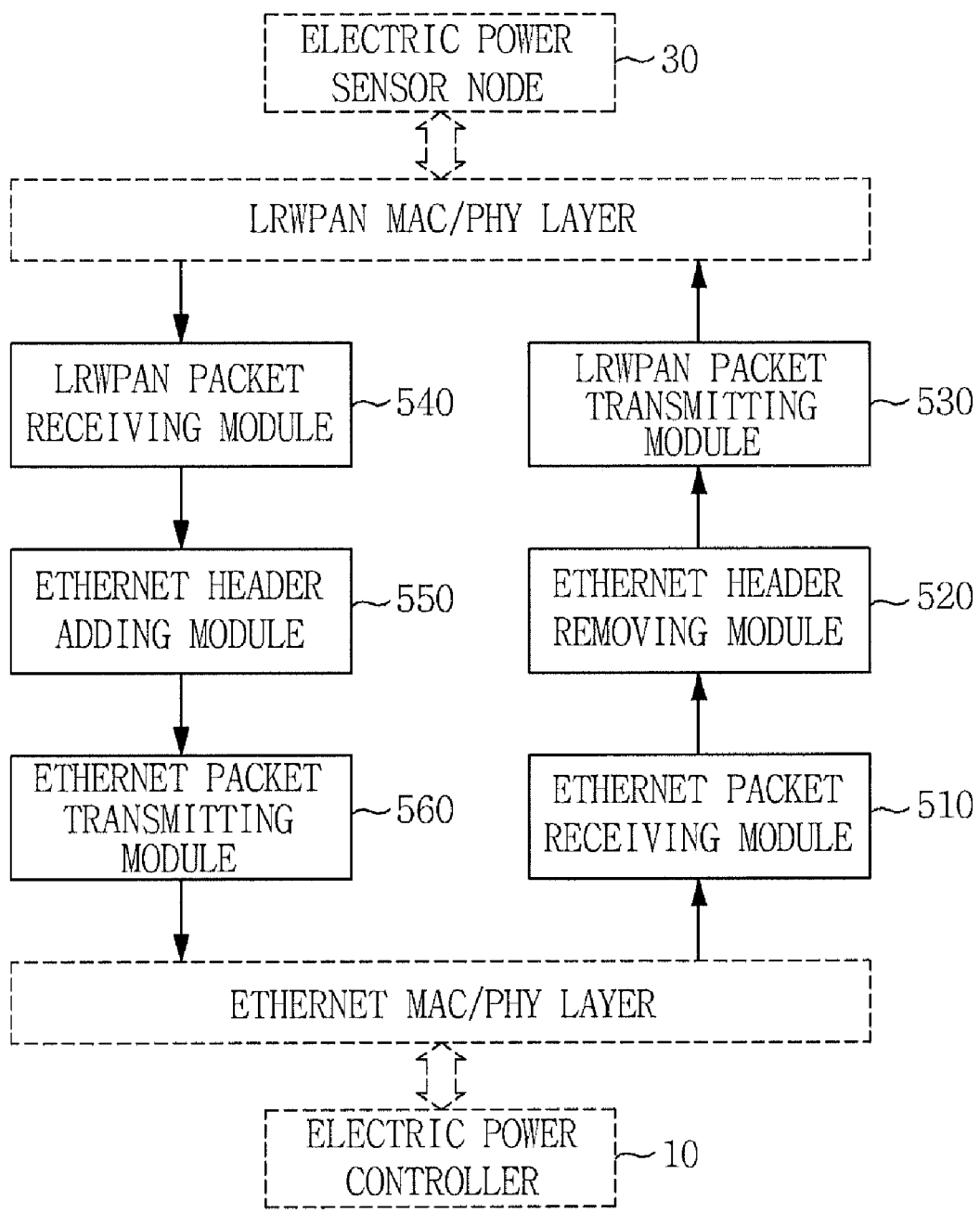
FIG. 7 is a configuration diagram showing internal modules of an LRWPAN-Ethernet bridge.

FIG. 7 is a configuration diagram showing internal modules of an LRWPAN-Ethernet bridge.

Referring to FIG. 7, the LRWPAN-Ethernet bridge includes an Ethernet packet receiving module 510, an Ethernet header removing module 520, an LRWPAN packet transmitting module 530, an LRWPAN packet receiving module 540, an Ethernet header adding module 550, and an Ethernet packet transmitting module 560.

The Ethernet packet receiving module 510 as a module receiving data in the Ethernet packet form from the Ethernet MAC layer serves to manage a received buffer.

The Ethernet header removing module 520 serves to remove the Ethernet header information from the received Ethernet packet and analyze the payload information. The analyzed message information loaded on the Ethernet payload is configured in the form of the 802.15.4 LRWPAN packet by the LRWPAN packet transmitting module 530 and transmitted to the electric power sensor node through the LRWPAN MAC/PHY layer. The packet received by the electric power sensor node is received in the packet form by the LRWPAN packet receiving module 540.

Herein, the received message is loaded on the payload of the Ethernet packet by the Ethernet header adding module 550 and the Ethernet packet transmitting module 560. The Ethernet MAC header is added to the received message to be transmitted to the electric power controller.

Figure 8:
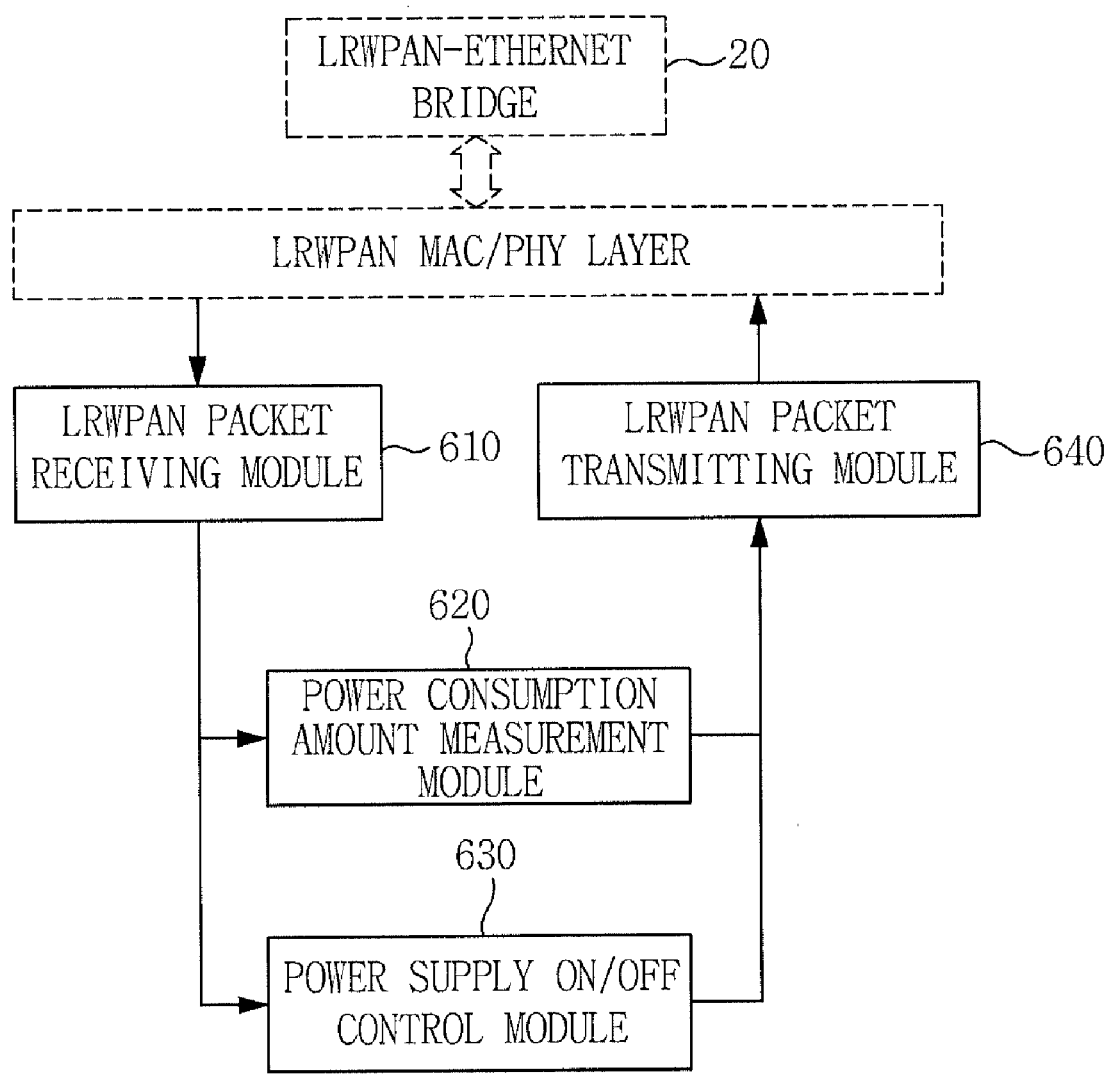
FIG. 8 is a configuration diagram of internal modules of the electric power sensor node.

FIG. 8 is a configuration diagram of internal modules of the electric power sensor node.

Referring to FIG. 8, the electric power sensor node includes an LRWPAN packet receiving module 610, a power consumption amount measuring module 620, a power supply on/off control module 630, and an LRWPAN packet transmitting module 640.

The LRWPAN packet receiving module 610 as a module receiving the packet from the LRWPAN MAC layer serves to manage an internal buffer. Further, the LRWPAN packet receiving module 610 analyzes the payload from the collected packet to analyze the command and calls a module performing the corresponding command.

The power consumption amount measuring module 620 as a module serving as a state information command of the electric power sensor node serves to collect an electric power measurement value and load the corresponding information on the payload.

The power supply on/off control module 630 serves to process a command to interrupt or supply a power supply from or to equipment connected to an electric power sensor and serves to load the result value on the payload after performing the corresponding function.

The LRWPAN packet transmitting module 640 adds the LRWPAN packet header to the response messages loaded on the payload and transmits the response messages with the LRWPAN packet header to the LRWPAN-Ethernet bridge.

According to an embodiment of the present invention, it is possible to configure an electric power control network even in a shadow area where distortion and attenuation of a wireless signal may occur due to a wall or a structural position and a circumferential environment or an area where a plurality of wireless repeaters need to be duplicately installed.

Further, according to the embodiment of the present invention, a bridge device efficiently utilizing an infrastructure of a wire network is mounted and the electric power sensor nodes in the shadow area may be connected through the corresponding bridge device.

According to the embodiment of the present invention, it is possible to provide both high reliability and low power consumption through an electric power control method using the bridge device which operates based on a lower-power minimum load type network layer having an electric power control function.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. A method for controlling electric power in an electric power controller, comprising:
    transmitting an Ethernet packet type command message to at least one electric power sensor node through an LRWPAN-Ethernet bridge in accordance with profile information related to an electric power control, the profile information being set by a user;
    receiving LR-WPAN packet type response messages transmitted from the at least one electric power sensor node in response to the Ethernet package type command message as Ethernet packet type response messages through the LRWPAN-Ethernet bridge; and
    providing a control result of an electric power equipment to the user based on the Ethernet packet type response messages.

2. The method of claim 1, wherein the at least one electric power sensor node is connected with the electric power equipment and the Ethernet packet type command message includes information for controlling the electric power equipment.

3. The method of claim 1, wherein the electric power controller is connected with a plurality of LRWPAN-Ethernet bridges through a wire communication network and the Ethernet packet type command message includes an MAC address for identifying the plurality of LRWPAN-Ethernet bridges.

4. The method of claim 3, further comprising retrieving the MAC address for identifying the electric power controller among the Ethernet packet type response messages,
    wherein the receiving the LR-WPAN packet type response messages receives an Ethernet packet type response message including the MAD address for identifying the electric power controller.

5. The method of claim 4, further comprising retrieving identification information of the at least one electric power sensor node,
    wherein the receiving the LR-WPAN packet type response messages filters the Ethernet packet type response message duplicately received based on the identification information of the at least one electric power sensor node.

6. The method of claim 2, wherein the Ethernet packet type command message includes a state information request message for the at least one electric power sensor node and the providing the control result provides a state information of the electric power equipment to the user based on the Ethernet packet type response messages.

7. The method of claim 2, wherein the Ethernet packet type command message includes a command message for turning on/off a power supply of the electric power equipment and the providing the control result provides an on/off state of the power supply of the electric power equipment based on the Ethernet packet type response messages to the user.

8. The method of claim 7, wherein the transmitting the Ethernet packet type command message transmits the command message to an electric power sensor node connected with the electric power equipment to be turned on/off among the at least one electric power sensor node.

* * * * *